United States Patent [19]

Rickert

[11] 3,893,695
[45] July 8, 1975

[54] METHOD AND CIRCUIT ARRANGEMENT FOR CONTROLLING THE BRAKING OF A DRIVE

[75] Inventor: Alfons Rickert, Schallern, Germany

[73] Assignee: Nixdorf Computer AG, Paderborn, Germany

[22] Filed: Jan. 2, 1974

[21] Appl. No.: 429,792

[30] Foreign Application Priority Data
Dec. 30, 1972 Germany.......................... 2264323

[52] U.S. Cl............. 303/21 P; 187/29 R; 192/127; 235/150.2; 235/151.11; 246/182 B; 303/20; 318/369
[51] Int. Cl............................................... B60t 8/00
[58] Field of Search...................... 73/490, 506, 518; 180/82 R; 187/29 R; 188/181 R; 192/127; 235/150.2, 150.24, 151.11; 226/33, 38; 246/182 B, 187 B; 303/20, 21; 318/143, 265, 269, 270, 275, 369, 571, 625; 324/160, 161; 340/53, 62, 263; 328/71, 109; 331/177; 317/5

[56] References Cited
UNITED STATES PATENTS

| | | | |
|---|---|---|---|
| 3,519,805 | 7/1970 | Thorne-Booth | 303/21 P UX |
| 3,564,367 | 2/1971 | Wanner et al. | 318/369 X |
| 3,613,835 | 10/1971 | Vizzotto | 187/29 R |
| 3,721,811 | 3/1973 | Taylor et al. | 318/369 X |
| 3,741,348 | 6/1973 | Caputo | 187/29 R |
| 3,785,463 | 1/1974 | Kuhl et al. | 187/29 R |

Primary Examiner—Trygve M. Blix
Assistant Examiner—Stephen G. Kunin
Attorney, Agent, or Firm—Woodhams, Blanchard and Flynn

[57] ABSTRACT

A method and circuit for controlling the braking operation of a drive to slow the movement of an object along a predetermined path and to stop the moving object precisely at a target position. Timing pulses are produced by the moving object, which timing pulses reflect the movement of the object over a predefined segment along the path, each predefined segment being equal to the other. The timing pulses are fed to an actual position signal generating device which generates a signal representative of the location of the moving object along the path from a starting position. A target position signal generating device produces a signal indicative of the location of the target along the path. Both the actual position signal and the target position signal are fed to a subtraction circuit and a difference signal is produced thereby which is proportional to the relationship between the actual velocity of the moving object and the remaining distance to be travelled by the moving object. The difference signal is fed to a digital-analogue circuit and controllable current source and thence to a chargable capacitor, the rate of increase of the charge on the capacitor being precisely controlled so that when the charge on the capacitor reaches a predetermined magnitude, a comparator circuit will be activated by reason of the charge on the capacitor exceeding or falling below a reference voltage to either activate or deactivate a braking action on the moving object or to initiate an acceleration of the moving object.

8 Claims, 3 Drawing Figures

3,893,695

METHOD AND CIRCUIT ARRANGEMENT FOR CONTROLLING THE BRAKING OF A DRIVE

FIELD OF THE INVENTION

The invention relates to a method for controlling the braking of a drive to slow the movement of an object along a predetermined path until a target position is reached, in which by means of a timing cycle which is derived from equally spaced path segments a signal is produced which is the analogue of the respectively remaining distance to be travelled for controlling the braking operation. Furthermore the invention relates to a circuit arrangement for carrying out this method.

BACKGROUND OF THE INVENTION

A control of a braking function for drives to slow the movement of an object travelling along a predetermined path to a stopped condition is usually accomplished, for example, for the purpose of precisely transporting and stopping magnetic or optic reading heads, workpieces and also elevators with the fastest possible and most favorable speed at the target position. Requirements of various types must thereby be met which, for example, relate to an avoidance of an excessive overshooting of the object at the target position or an avoidance of correcting steps which can become necessary by an unexact reaching of the target position. Such interferences can be caused on the one side by the mass of the object to be transported and stopped and on the other side also by irregular frictional influences during the braking operation.

It is already known (compare for example German Auslegeschrift No. 1 100 898) to carry out from different starting positions delay controls for reaching a target position while desiring optimal conditions in such a manner that one approximates the braking operation to a parabolic braking characteristic, which characterizes the optimum braking retardation. It is furthermore known (compare for example German Auslegeschrift No. 1 588 074) to achieve the parabolic braking characteristic in such a manner that one evolves a signal value which was derived by means of cycling the path and which is an analogue to the respectively remaining distance to be travelled. In this manner, one obtains always a nominal magnitude which characterizes the velocity for the remaining distance to be travelled, which velocity is given according to the parabolic braking retardation, since, as is known, velocity and distance are connected through a parabolic function. This nominal magnitude then permits a control operation to regulate the respective actual velocity to the nominal value.

The known methods for approximating the movement of an object during the delay to the optimum parabolic braking characteristic have, however, various disadvantages. They must be carried out with a relatively low exactness which only can be achieved in the optimum case and require a very highly technical circuit and much expense. Furthermore it is shown that in spite of such circuit arrangements which practically operate without any errors, the desired target position is reached only with errors in the parabolic braking characteristics, because during braking, unavoidable tolerances due to frictional influences occur, the effects of which can naturally not be compensated for not even by very exactly operating circuits. Furthermore an exact duplication of the brake parabola is not possible in actuality because the signals for producing this waveform are first produced digitally, because from the distance covered by the moved object at a tolerable expense only digital values can be derived through an evaluating of the timing signals. Accordingly, also at a converting of the digital values into analogue values, such a parabolic course of the braking characteristic will be the result which is approximated in a steplike manner. Even in the case of the finest graduation, the decomposition of which is given by the timing division of the covered distance, inaccuracies are then obtained which make the perfect reaching of the desired target point impossible without additional corrections.

One use of controls, of the here considered type, in which the highest exactness at an economical operation is required, is for example, the transport of recorder heads in data processsing installations. Such movements must occur with the highest possible speed to maintain the operating speed necessary for electronic data processing and must stop at a specified point with the highest exactness within the shortest possible time in order to obtain in a data printer a uniform type character which can be evaluated through further electronic devices. In order to increase the preciseness in drives of this type, a two-step operation for the retardation is carried out. First the printing head is retarded from a normal speed to a certain speed before the actual target position, and then the drive is switched over to a so-called "crawling" speed. The still remaining relatively short distance in then travelled at the crawling speed and at the shortest possible distance before the target position a braking mechanism is switched on which stops the printing head at the target position. This method thus requires relatively little exactness for the crawling speed, however, a high exactness for reaching a specified point at which the crawling speed is supposed to start. If here greater inaccuracies are permitted, then the time until the target position is reached is extended. Independent from whether the finally reached rest condition or already the starting point of the crawling operation is to be considered as a target position, here too a high braking exactness must be realized.

The purpose of the invention is to give a method and a circuit arrangement which makes it possible, at the smallest possible expense, however, and at a high degree of exactness, to assure a perfect reaching of a specified position of a moved object along a predetermined path.

A method of the type mentioned above is constructed in such a manner that during each a single time cycle signal is produced which is proportional to the relationship between actual velocity and the respective remaining distance to be travelled and the value of this signal is compared with a given value which is constant during the braking operation for a relationship between velocity and remaining distance corresponding to a linear velocity reduction which is effective over the predetermined distance compared with a parabolic slower speed reduction, and that depending on the sign digit of the comparison result, a signal is produced which effects the braking or the freewheeling or the acceleration of the drive.

Important for the invention is the recognition that a straight-line waveform of the braking characteristic with a small time delay compared with the parabolic waveform can be accepted if through this it is assured that the desired target position can be reached more exactly than in the case of a parabolic braking characteristic. For the waveform of the braking characteristic, the relationship between the velocity and the respectively remaining distance to be travelled indicates the slope in a respective point. If now, as a specified value, a constant relationship between velocity and remaining distance is used, then this means that a linear braking characteristic is specified. Through the magnitude of the chosen constant value, it is possible to easily determine the slope of the straight line displaying the linear braking characteristic relative to the optimum brake parabola. If now a relationship is formed between the respective analogue value of the remaining distance and the easily to be derived actual speed and thereafter same is compared with the specified constant value, it is possible to state how far the respective instantaneous value of the velocity differs from the velocity value specified by the linear waveform of the braking characteristic, so that a corresponding correction can be carried out. If this operation occurs in a time controlled manner, then a velocity correction during individual timing intervals is possible so that finally a braking operation is determined which is steplike approximated to the specified braking line.

This steplike approximation does not cause, due to the linear waveform of the braking characteristic, such great errors and such a high expense as does the steplike approximation of a parabola. The steplike approximation of a parabola at a constant braking torque is namely more difficult due to a required parabolically changing control magnitude than the steplike approximation of a braking line. The here variable acceleration is obtained automatically without any special control magnitude through the time controlled adjustment of the braking signal. The important advantage of a method of the invention is to control the braking characteristic to a linear waveform with a very high exactness and at a very small expense and to accept a small time extension of the braking operation until the target position is reached. Furthermore no special time control for the braking operation is required because the braking operation is controlled by the time which is derived speed-dependently from the path.

By using a linear braking characteristic, it is furthermore without any additional expense, possible to characterize the starting point of the braking operation automatically because the comparison carried out according to the invention signals each point of intersection of the velocity-distance-characteristic with the braking line. Since the braking line in this characteristic connects the starting point of the braking with the end point corresponding to the target position, this criteria appears automatically in the case of distance stretches which are longer than the predetermined stopping path during the first intersection with the braking line. This is, however, also true, as will yet be described, at a corresponding slope of the braking line, for shorter distance stretches in which the braking line is passed by the still increasing velocity-distance-characteristic.

The method of the invention can be further constructed in such a manner that the specified value is produced for a linear delay characteristic which intersects the ideal parabolic delay characteristic. Through this it is possible to arrange the target point very closely to the end point of a parabolic braking characteristic. Due to the fact that the linear braking characteristic intersects the parabolic waveform, there is thus first possible an extensive adjustment of the braking operation to the parabolic waveform by producing a constant continuous braking torque, until through the evaluation of the mentioned comparison upon reaching a certain still remaining distance and a certain velocity, the point of intersection of the linear characteristic with the parabolic characteristic is determined. From this point in time on, which can lie relatively close to the target place which is actually supposed to be reached, the braking is then further regulated corresponding with the linear waveform.

SUMMARY OF THE INVENTION

An advantageous embodiment of the method of the invention is characterized in that for producing the mentioned signal an integration of the signal, which is an analogue to the remaining distance to be travelled, over a single cycle is carried out. Through the integration process, namely the product between the signal which is the analogue is formed to the remaining distance and the time which occurs in the respective timing period, which analogue corresponds to the relationship between remaining distance and actual velocity, because the time of a single cycle of the actual velocity is inversely proportional and the distance travelled in the timing period is constant. In this manner very simple switching elements having storage characteristics can be used for illustrating the signal which is proportional to the relationship between actual velocity and the respective remaining distance, so that expensive circuit arrangements which perhaps carry out an evolution are avoided. Of course it is also possible to carry out the integration over one half of the timing period if the starting and the end portions of the timing pulses can be evaluated with sufficient exactness.

The integration function can very simply occur through time controlled charging of a capacitor with a constant current the magnitude of which is measured proportionally to the magnitude which is an analogue to the remaining distance to be travelled. This capacitor can be alternately charged and discharged during the successive timing periods.

A circuit arrangement for carrying out the method according to the invention is characterized by a subtracting circuit which is controlled by a nominal signal value characterizing the end point of the predetermined distance and by an actual signal value characterizing the respective position of the object, which subtracting circuit delivers an output signal which corresponds to the difference between the nominal and actual signal values. This output signal is fed to a digital-analogue converter which adjusts the working point of a constant current source arranged in the charging circuit of a capacitor. A switching mechanism is controllable by timing signals which are derived from the movement of the object along the path to effect a time controlled discharging of the capacitor and a time controlled active switching of a brake control circuit, which passes on the output signal of a comparator circuit which indicates the falling below of a given reference voltage which is measured corresponding with the constant value for a relationship between velocity and remaining distance through the capacitor charging voltage as a braking signal to the drive.

This circuit arrangement operates with digital characteristics which permit a carrying out of the invention at relatively low expense, however, assuring, through the principle of the invention, an optimum stopping of the object precisely at the target point. The circuit permits the generation of a signal which is useable for initiating a braking function, a freewheeling function or an acceleration function of the associated drive.

BRIEF DESCRIPTION OF THE DRAWINGS

One exemplary embodiment of the invention will be described hereinafter in connection with the figures, they show.

DETAILED DESCRIPTION

Figure 1:
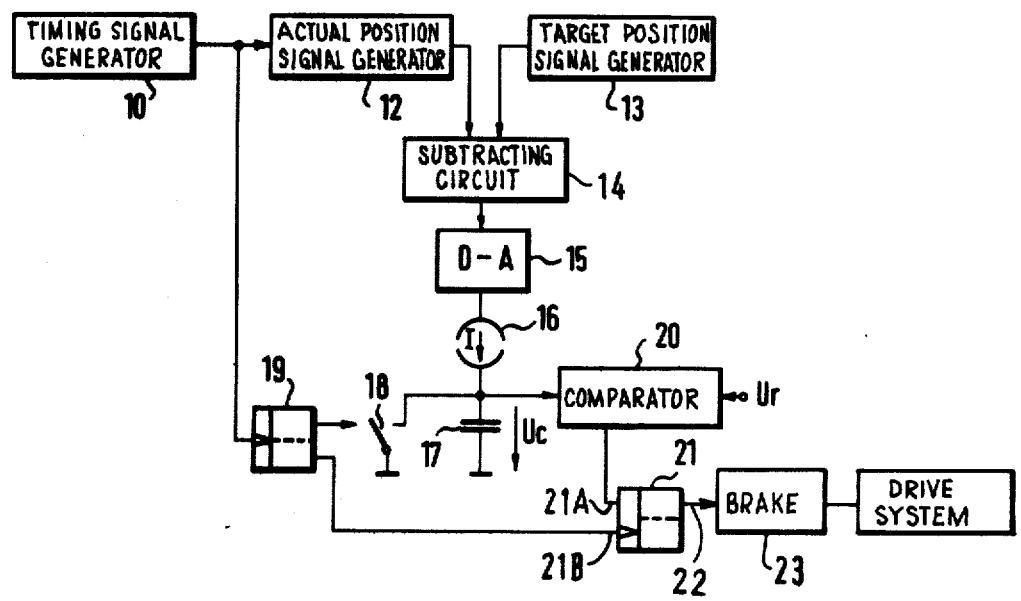
FIG. 1 is a schematic diagram of an arrangement embodying the invention.

FIG. 1 illustrates a schematic diagram of an arrangement for carrying out a braking operation on a moving object and has a characteristic in the form of a braking line described in more detail hereinbelow. An arrangement of this type can be used for braking any number of desired moving objects which are to be stopped within a specified distance at a target position. A particularly important example of use of this arrangement is in the movement of a recorder head in a data printer; in connection with such a case of use the invention will be described hereinafter. However, it is to be understood that other uses of the invention are contemplated and that the following description is not to be limiting.

A signal generator 10 produces a series of timing pulses, or working cycles, which, with respect to the distance, are equally spaced, the lateral distance of which, however, is variable corresponding to the velocity of the moving load. The timing pulses can, for example, be generated by a transducer which is activated, based on the movement of the load, by magnetic, optic or mechanical pulses. Such a device can be constructed in a simple manner by utilizing a disk which rotates at a speed which is proportional to the rotational speed of the drive. The disk has at its periphery and at regularly spaced intervals a plurality of holes through which a light source acts onto a photocell. The photocell then generates electrical timing pulses, the frequency of which is proportional to the speed of rotation of the perforated disk.

The timing signals are fed into a counter 12. The counter accumulates the timing signals and indicates the actual position of the moving object by measuring the respectively covered distance. Furthermore, a target position signal generator 13 is provided into which the target position or location is fed, for example through a keyboard or an electronic control, as a signal value which corresponds to the sum of the timing pulses for the entire distance. For operating a recorder head in a data printer, the target position is controlled, in most cases, by a command from the print control of the associated data processing machine. Thus, the target position signal generator 13 may be a circuit arrangement which is a part of the data processing machine. The output signals of the actual position signal generator 12 and of the target position signal generator 13 are fed through a line into a subtracting circuit 14, the digital output signal of which indicates the difference of its two input signals. The difference between actual position signal and target position signal corresponds to the respective remaining distance which must yet be covered by the moving object. This digital signal is fed to a digital-analogue-converter 15 which generates an analogue signal which is directly proportional to the remaining distance which must still be covered by the moving object.

The analogue output signal of the digital-analogue-converter 15 serves to vary the working level of a constant current source 16 which is connected to a capacitor 17. The output current from the current source 16 is constant at each of its different magnitudes of output energy. That is, the current source 16 will produce a selected valve of current independent of the load impedance. The capacitor 17 is charged by the current from the current source 16 and the magnitude of the current is proportional to the analogue output signal of the digital-analogue-converter 15. The charging voltage on the capacitor 17 thus increases linearly from an initial value. A switching mechanism 18, schematically illustrated as an operating contact, is connected in parallel with the capacitor 17, and is controlled by a bistable circuit 19. The input terminal of the bistable circuit 19 is connected to the output of the timing signal generator 10 and the bistable circuit 19 is controlled by each of the positive going portions of the series of timing pulses so that the capacitor 17 is alternately charged and discharged depending on the working cycle and that a saw-tooth shaped voltage variation is generated on the capacitor 17.

The charging voltage $U_c$ of the capacitor 17 is fed together with a reference voltage $U_r$ to a comparitor circuit 20. The comparator circuit 20 generates an output signal which is fed to a further bistable circuit 21 which is controlled by the output signal from the bistable circuit 19 when the charging voltage $U_c$ on the capacitor 17 is smaller than the reference voltage $U_r$. The bistable circuit 21 works as a brake control circuit and generates at its output 22 terminal a signal which for its duration effects through a brake 23 a braking of the movement of a recorder head.

The bistable circuit 21 has a gate input terminal 21A which is connected to the comparator circuit 20 and a releasing input terminal 21B which is connected to the bistable circuit 19. As will be described in more detail below, a signal change will occur at the output terminal 22 when an output signal is generated at the comparator circuit 20 and when an output signal is generated at the bistable circuit 19. The output signal at the output terminal 22 thus assumes as a function of the switching over of the bistable circuit 19 the output condition of the comparator circuit 20.

The circuit illustrated in FIG. 1 produces a braking function having a linear braking characteristic. The analogue output signal at the output terminal of the digital-analogue-converter 15, which output signal indicates the respective remaining distance to be travelled by the moving object, varies the magnitude of a constant charging current generated by the constant current source 16. The current signal is integrated by the capacitor 17 through a single timing period and generates a capacitor charge $U_c$, the voltage of which indicates the relationship between the actual velocity and the remaining distance to be travelled. This is due to the fact that the charge $U_c$, which is accumulated on the capacitor 17 during a single timing period, has a value which is the product of the constant charging current I and the respective time interval of a single timing period. Since the distance travelled in a single timing period is constant, the capacitor charge or the capacitor voltage $Uc$ indicates the relationship between the remaining distance to be travelled and the actual velocity of the moving object because the time in a single timing period is then inversely proportional to the actual velocity. If both the capacitor voltage $Uc$ and the constant reference voltage $Ur$ are simultaneously fed to the respective input terminals of the comparator circuit 20, the output from the comparitor circuit 20 can in a simple manner deliver a predetermined velocity retardation per unit of time criteria and an indication as to how much the capacitor voltage $Uc$, namely the relationship between actual velocity and remaining distance to be travelled, differs from a predetermined and constant value, representative of the slope of a predetermined velocity retardation per unit of time braking line. If the capacitor voltage $Uc$ lies above the reference voltage $Ur$, this criteria is related to a braking characteristic having a velocity retardation per unit of time inclination which is too great with respect to the predetermined braking line and no braking signal is produced by the brake control circuit, namely the bistable circuit 21. The drive for the recorder head or of the object which is to be stopped is then in a freewheeling condition until a velocity condition occurs which will result in the capacitor voltage $Uc$ becoming equal to or less than the reference voltage $Ur$. This criteria is related to a braking characteristic having a velocity retardation per unit of time inclination which is too small with respect to the predetermined braking line so that a corresponding output signal from the comparator circuit 20 will be fed in a time-controlled manner through the brake control circuit 21 to its output terminal 22 as a braking signal onto the drive system for the moving object.

Figure 2:
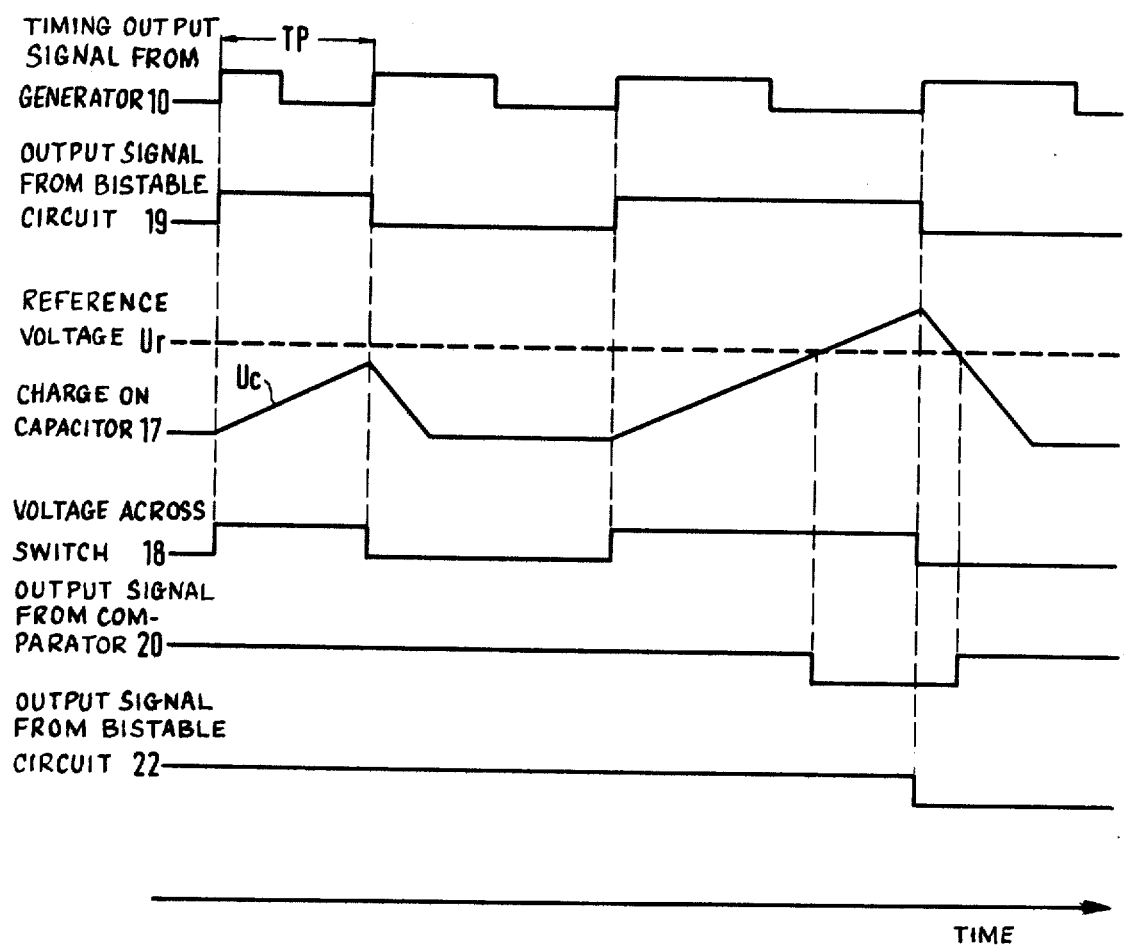
FIG. 2 illustrates signal waveforms in the arrangement according to FIG. 1.

FIG. 2 illustrates signal waveforms which will facilitate an understanding of the function of the arrangement illustrated in FIG. 1. These signal waveforms are each provided with reference numerals which correspond to the components referred to in FIG. 1.

The signal waveform 10 illustrates the timing pulses which are delivered by the device 10 illustrated in FIG. 1. The respective timing period TP corresponds to one timing pulse as well as succeeding longer timing pulses. It will be recognized that in the example chosen in FIG. 2, due to a slowing of the movement of the object, the timing periods become longer from the left to the right.

The signal waveform 19 characterizes the operation of the bistable circuit 19. The circuit 19 is reversed with the positive going wave front of each of the timing pulses so that it controls the switching mechanism 18 in a suitable manner as can be recognized from a comparison of the signal waveforms 18 and 19 in FIG. 2. It, therefore, becomes very clear how the capacitor 17 is continuously charged and discharged as a function of the operating position of the switching mechanism 18. For example, when the switch 18 is open, the current I will charge the capacitor 17. When the switch 18 is closed, the capacitor will discharge. In FIG. 2, the signal waveform 17 represents the voltage $Uc$ of the capacitor and which has a substantially saw-tooth shaped waveform. Through the constant charging current I from the constant current source 16, the waveform of the capacitor voltage $Uc$ during charging periods is linear, while during discharging periods this waveform can be accelerated in such a manner, through the switching elements which are not illustrated in FIG. 1, as to be practically linear.

FIG. 2 illustrates the relative position between the magnitude of the capacitor voltage $Uc$ and the magnitude of the constant reference voltage $Ur$. The first, leftmost, charging operation of the capacitor 17 within the first timing period TP leads to a capacitor voltage $Uc$ which lies below the reference voltage $Ur$ so that at the comparator circuit 20 an output signal which was already in existence remains at the output terminal thereof. Correspondingly, there also exists at the output terminal 22 a braking signal which was introduced through a signal applied to the releasing input terminal 21B of the bistable brake control circuit 21 from the bistable circuit 19, which signal was generated during a previous but not discussed time period.

A discharge of the capacitor 17 occurs in the second timing period as illustrated in FIG. 2 and is followed by a renewed charging cycle, which due to the further slowing of the movement of the object leads to a capacitor voltage $Uc$ which is greater in magnitude than the reference voltage $Ur$. From FIG. 2 one can see that for the duration of time that the voltage $Uc$ is greater than the voltage $Ur$ a signal change occurs at the output terminal of the comparator circuit 20 and causes through the connection to the gate input terminal 21A of the brake control circuit 21 an energization of the gate terminal 21A. However, no signal will be produced at the output terminal 22 until the next switching over of the bistable circuit 19 which energizes the releasing input terminal 21B and initiates a change of the braking signal at the output terminal 22 and results in a control of the drive into the freewheeling condition.

Through the freewheeling condition of the drive, the timing periods of the signal waveform 10 are now again shortened so that, depending on the length of the remaining distance to be travelled, a condition will follow, namely the capacitor voltage $Uc$ will be below the reference voltage $Ur$. A switching over of the signal at the output terminal 22 will occur in a now understandable manner and a change will occur from the freewheeling condition to the braking condition, namely at the next positive going wave front of the signal waveform 19.

Figure 3:
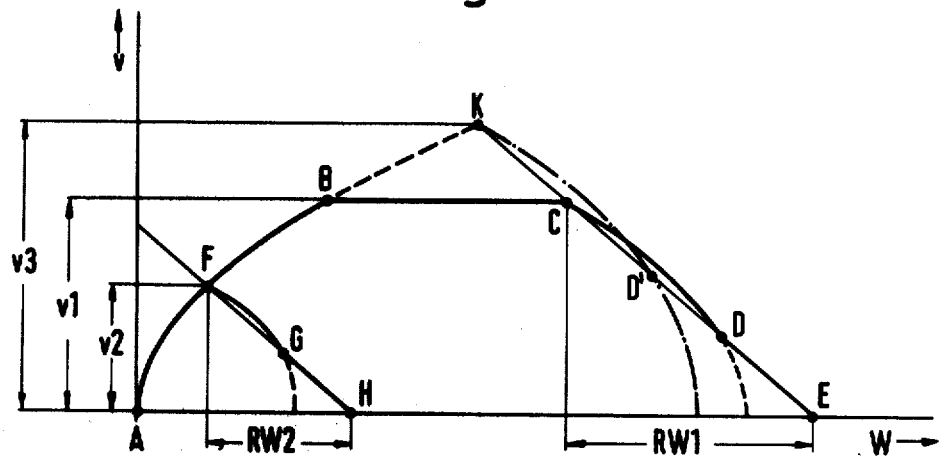
FIG. 3 schematically illustrates the movement of an object in the form of a velocity-distance diagram.

FIG. 3 illustrates a velocity-distance diagram corresponding to a function $v = f(W)$ wherein $V$ is the velocity and $W$ is the distance. The path of movement through the distance $W$ of a driven object between a starting position A and a target position E is the abscissa of the diagram. The initial acceleration of the object has a parabolic accelerating characteristic until a maximum velocity $v1$ is achieved, which maximum velocity is then maintained between the points B and C of the distance travelled by the object. At point C a braking action begins over a specified remaining distance RW1, which braking action extends longitudinally along the velocity retardation per unit of time line CDE and stops the object at the target point E. If now by means of an arrangement of the type illustrated in FIG. 1, a surveillance of the relationships between the actual velocity and the remaining distance to be travelled is continuously being carried out, a condition change will occur at the output of the comparator circuit 20 at the point of intersection C between the horizontally extending line BC and the line CDE and the relationship between actual velocity and the remaining distance to be travelled corresponds then to the value defined by the slope of the braking line CE. This can be termed as the critieria for the starting of the braking operation, namely an automatic start condition for the braking operation. It is, however, also possible to start a braking operation at any other desired points during a high velocity operation if the target point E was determined accordingly by the target position signal generator 13 illustrated in FIG. 1. In any case, the starting point for the braking operation exists automatically depending on the slope of the braking line CE if the line BC intersects the braking line CE.

At point C, a braking signal is produced which first remains continuously in existence because the now reached zone of the remaining distance RW1 causes a capacitor voltage $Uc$ to be smaller than the reference voltage $Ur$. Through the now constant braking torque applied by the brake 23, first in the zone CD the ideal brake parabola is passed through. Only after the velocity has decreased by a certain amount is the capacitor voltage $Uc$ charged to a value which is above the value of the reference voltage $Ur$ and the braking signal at the output terminal 22 of the brake control circuit 21 interrupted. The drive mechanism coupled with the object which is to be conveyed is changed into the freewheeling condition. The freewheeling condition remains in existence until the braking line CE is intersected again and a voltage $Uc$ is generated at the capacitor 17 which is below the reference voltage $Ur$. Then a braking signal is again produced which controls the braking of the object to maintain a linear braking characteristic along the line CE. This braking operation decreases the velocity of the object in a steplike manner and in small parabolic segments until the target point E is reached.

It will be recognized that with a very simple arrangement which is mainly composed of digital units and which arrangement is of the type illustrated in FIG. 1, a very exact control, particularly in the last part (section DE in FIG. 3) of a braking characteristic, can be achieved. It must also be noted that the time required for braking at a suitable slope of the braking line CE is only slightly longer compared with the braking time which would exist if a parabolic braking characteristic existed. This difference can be seen from the difference between the remaining distance RW1 and the end point of the brake parabola which is illustrated in the further course by dashes in FIG. 3.

A braking operation will be considered hereinafter in which an arrangement, according to FIG. 1, brings about special advantages. Such an operation is, for example, a short jumping movement (quick start to stop time) at the start of the braking operation at which the maximum velocity $v1$ has not yet been reached on the line BC illustrated in FIG. 3. For this it is, for example, assumed that the target position signal generator 13 is adjusted to the target position H. In this case the comparator circuit 20 will change its output signal condition when the braking line FH is passed through by the parabolic acceleration characteristic at the velocity $v2$. This criteria can be evaluated in a not illustrated manner as start of braking criteria. At this point in time the remaining distance to be travelled RW2 up to the target position H still exists, which distance is considerably shorter than the remaining distance RW1. As previously described, a braking operation occurs, first with a constant braking torque along a parabola to the point G at which time this parabola intersects the braking line FH. Starting from the point G there starts now the operations which have already been discussed for the distance GH corresponding to the earlier described braking along the line CE, until the target position H is reached.

Thus with a circuit arrangement according to the invention, a target point can be reached also for such jumping movements wherein the length of travel is less than the aforedescribed distance for a normal braking operation and with an exactness equal to the situation involving long distances. For this no other additional circuit measures are required.

FIG. 3 illustrates a braking operation which corresponds to the one illustrated for the short start to stop movements if velocities above the assumed maximum velocity $v1$ are possible. In this case the acceleration will occur along the parabola starting out from the starting point A until to the point K is reached which is at a velocity $v3$ whereat the point K intersects the extended braking line KE, so that an automatic braking operation will occur until the target position E is reached. This braking operation takes place first in the described manner along a parabola illustrated in a dash-dotted line in FIG. 3, until the braking line KE is again intersected at the point D'. Thereafter, braking occurs in the described steplike approximation along the line D'E until to the target position E is reached.

An arrangement of the type illustrated in FIG. 1 can also be changed in such a manner that the controlled braking does not occur with timing periods, but, for example, with the timing interval or the duration of the timing pulses. In this case, it is possible to produce the braking signals by a direct control of the charging of the capacitor 17 by the timing pulses or the timing intervals, so that the bistable circuits 19 and 21 are not needed.

It is furthermore possible to use a reference voltage $Ur$ which is dimensioned proportional to the respectively determined remaining distance, whereby then the capacitor 17 is not charged with constant currents which are proportional to the remaining distance but is charged in a time controlled manner with a specified current. Also this method compares the two obtained voltages to a criteria which indicates the variation of the relationship between the actual velocity and the respective remaining distance from a given value so that a braking operation is possible which is controlled along a linear braking characteristic.

The signal at the output terminal 22 which characterizes the conditions "braking" and "freewheeling" for the described exemplary embodiments can also be used for controlling acceleration operations which may become necessary in place of "freewheeling".

Although a particular preferred embodiment of the invention has been disclosed above for illustrative purposes, it will be understood that variations or modifications thereof which lie within the scope of the appended claims are fully contemplated.

The embodiments of the invention in which an exclusive property or priviledge is claimed are defined as follows:

1. A method for controlling the braking of a drive to slow the movement of an object along a predetermined path until a target position is reached, comprising the steps of:

generating a plurality of time cycles which are repeated at equally spaced intervals along the path of movement;

generating a first signal which is the analogue of the respectively remaining distance to be travelled;

generating during a single time cycle a second signal having a magnitude which is proportional to the relationship between the actual velocity of the moving object and the respective remaining distance to be travelled;

comparing during said time cycle the magnitude of said second signal with a selected value which is constant during the braking operation to define a relationship between velocity and the remaining distance to be travelled corresponding to a linear velocity reduction which is effective over the predetermined distance compared with a parabolic slower speed reduction;

generating adjacent the end of said time cycle a third signal in response to said comparison to effect, depending on the sign of the comparison, either a braking or a freewheeling or an acceleration of the drive for the object; and repeating, during other and progressively longer sequentially following time cycles, the foregoing steps to effect a step-by-step energizing and deenergizing a brake until said object has come to a complete stop at said target position.

2. A method according to claim 1, wherein the selected value is generated for a linear slowing characteristic which intersects the ideal parabolic delay characteristic.

3. A method according to claim 1, wherein for generating the mentioned magnitude an integration is carried out of the signal which is the analogue to the remaining distance to be travelled over said single timing period.

4. A method according to claim 3, wherein the integration step occurs through a time controlled charging of a capacitor with a constant current which is dimensioned proportionally to the magnitude which is an analogue to the remaining distance to be travelled.

5. A method according to claim 4, wherein the capacitor is alternately charged and discharged during successive timing periods.

6. A circuit for controlling the braking of a drive to slow the movement of an object along a predetermined path until a target position is reached utilizing a time cycle which is derived from equally spaced path segments and indicating a value which is the analogue of the respectively remaining distance to be travelled for controlling the braking operation, comprising first signal generating means for generating a first signal indicating the end of the path, second signal generating means for generating a second signal indicating the actual position of the object along the path, a subtracting circuit responsive to said first and second signals, said subtracting circuit generating a first output signal which corresponds to the difference between said first and second signals, a variable output constant current source, a digital-analogue converter responsive to said first output signal for adjusting the working point of said current source, a capacitor adapted to be charged by the current from said current source, a switching mechanism controllable by timing signals which are derived from the movement of the object along the path for producing a time controlled discharging of said capacitor, a source of reference voltage, a comparator circuit for comparing said reference voltage with the voltage on said capacitor and adapted to produce a second output signal indicative of the comparison and a brake control circuit responsive to said second output signal for initiating a time controlled operation of said brake to effect a predetermined rate of decrease in said velocity of said object.

7. A circuit according to claim 6, wherein the switching mechanism for the time controlled discharging of the capacitor is actively switchable by the first output signal of a time controlled bistable circuit, the second output signal of which releases the switching condition of the brake control circuit, which switching condition effects the passing on of the braking signal.

8. A circuit according to claim 6, wherein the brake control circuit is a second bistable circuit which can be released by the transition of the time controlled bistable circuit into its second switching condition and has a gate input terminal which is connected to the comparator circuit.

* * * * *